US011195494B2

(12) United States Patent
Zhai

(10) Patent No.: US 11,195,494 B2
(45) Date of Patent: Dec. 7, 2021

(54) SCREEN BRIGHTNESS ADJUSTMENT METHOD AND APPARATUS, AND STORAGE MEDIUM

(71) Applicant: BEIJING XIAOMI MOBILE SOFTWARE CO., LTD., Beijing (CN)

(72) Inventor: Dong Zhai, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/924,300

(22) Filed: Jul. 9, 2020

(65) Prior Publication Data

US 2021/0248975 A1 Aug. 12, 2021

(30) Foreign Application Priority Data

Feb. 12, 2020 (CN) ......................... 202010088821.0

(51) Int. Cl.

| | |
|---|---|
| ***G09G 5/10*** | (2006.01) |
| ***G09G 3/20*** | (2006.01) |
| ***H04N 1/60*** | (2006.01) |
| ***H04N 9/64*** | (2006.01) |
| ***H04N 9/73*** | (2006.01) |

(52) U.S. Cl.

CPC ....... *G09G 5/10* (2013.01); *G09G 2320/0247* (2013.01); *G09G 2320/0626* (2013.01); *G09G 2360/145* (2013.01)

(58) Field of Classification Search

CPC combination set(s) only.
See application file for complete search history.

(56) References Cited

U.S. PATENT DOCUMENTS

| | | | | |
|---|---|---|---|---|
| 10,832,619 | B2 * | 11/2020 | Li | H04W 52/027 |
| 2011/0193888 | A1 | 8/2011 | Yamato et al. | |
| 2011/0254940 | A1 * | 10/2011 | Suzukawa | H04N 7/183 348/77 |
| 2016/0035264 | A1 | 2/2016 | Fujii | |
| 2016/0093257 | A1 | 3/2016 | Wu | |
| 2016/0173862 | A1 * | 6/2016 | Huang | G09G 3/2003 348/51 |
| 2018/0158434 | A1 * | 6/2018 | Bian | G09G 5/10 |
| 2019/0362679 | A1 | 11/2019 | Pyo et al. | |
| 2021/0049966 | A1 * | 2/2021 | Hsu | G09G 3/3258 |

OTHER PUBLICATIONS

OA for EP application 20187692.7, mailed on Jan. 26, 2021.

* cited by examiner

*Primary Examiner* — Wesner Sajous
(74) *Attorney, Agent, or Firm* — Syncoda LLC; Feng Ma

(57) ABSTRACT

A screen brightness adjustment method includes: determining a direction of brightness adjustment based on a screen brightness adjustment instruction, and controlling a brightness level of a screen and a grayscale parameter of an image displayed on the screen based on the direction of brightness adjustment, such that brightness of the screen is adjusted to target brightness desired by the screen brightness adjustment instruction.

17 Claims, 3 Drawing Sheets

SCREEN BRIGHTNESS ADJUSTMENT METHOD AND APPARATUS, AND STORAGE MEDIUM

CROSS-REFERENCE TO RELATED APPLICATION

This application claims priority to Chinese Patent Application No. 202010088821.0 filed on Feb. 12, 2020, the disclosure of which is hereby incorporated by reference in its entirety.

BACKGROUND

Brightness adjustment of various screens is typically limited by hardware adjustment capability of the screen and the size of the panel border of the screen. Usually, the brightness of the screen from the brightest to the darkest can only be divided into a fixed number (e.g., 2,047) of brightness levels, and the brightness of the screen is controlled based on different brightness levels. During the adjustment process, when the brightness of the screen changes, especially in scenes where the screen is in a dark environment, the user may observe a significant brightness jitter (that is, flicker) on the screen.

SUMMARY

The present disclosure relates generally to the field of electronic control technologies, and more specifically to a screen brightness adjustment method and apparatus, and a storage medium.

Embodiments of the present disclosure provide a screen brightness adjustment method. The method includes: determining a direction of brightness adjustment based on a screen brightness adjustment instruction; and controlling a brightness level of a screen and a grayscale parameter of an image displayed on the screen based on the direction of brightness adjustment, such that brightness of the screen is adjusted to target brightness desired by the screen brightness adjustment instruction.

Embodiments of the present disclosure provide a screen brightness adjustment apparatus, the apparatus including: a determination module, configured to determine a direction of brightness adjustment based on a screen brightness adjustment instruction; and a control module, configured to control a brightness level of a screen and a grayscale parameter of an image displayed on the screen based on the direction of brightness adjustment, such that brightness of the screen is adjusted to target brightness desired by the screen brightness adjustment instruction.

Embodiments of the present disclosure provide a screen brightness adjustment apparatus. The apparatus includes a processor, and a memory configured to store instructions executable by the processor. The processor is configured to: determine a direction of brightness adjustment based on a screen brightness adjustment instruction; and control a brightness level of a screen and a grayscale parameter of an image displayed on the screen based on the direction of brightness adjustment, such that brightness of the screen is adjusted to target brightness desired by the screen brightness adjustment instruction.

Embodiments of the present disclosure provide a computer-readable storage medium having a computer program instruction stored thereon. When the program instruction is executed by a processor, the screen brightness adjustment method provided by the first aspect of the present disclosure is implemented.

It should be understood that the above general description and the following detailed description are only exemplary and explanatory, and may not limit the present disclosure.

BRIEF DESCRIPTION OF THE DRAWINGS

The accompanying drawings herein, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Before introducing a screen brightness adjustment method and apparatus, and a storage medium provided by the present disclosure, an application scenario involved in various embodiments of the present disclosure are introduced. The application scenario may be any kind of screen, for example, a screen on a terminal device such as a mobile phone, a notebook computer, a vehicle-mounted terminal, or a desktop computer, or an independent screen. The types of screens include, but are not limited to a LED (light-emitting diode) screen, an OLED (organic light-emitting diode) screen, an LCD (liquid crystal display) screen, a CRT (cathode ray tube) screen, etc.

Figure 1:
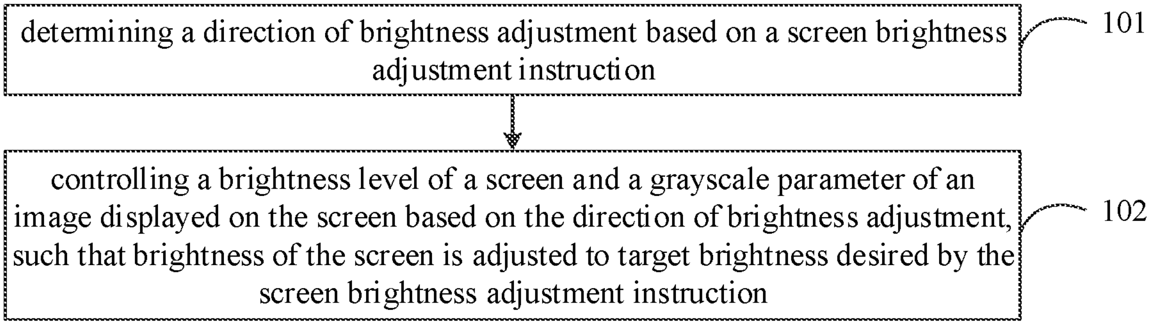
FIG. 1 is a flowchart of a screen brightness adjustment method according to some embodiments.

FIG. 1 is a flowchart of a screen brightness adjustment method according to some embodiments. As illustrated in FIG. 1, the method includes the following.

At block 101, a direction of brightness adjustment is determined based on a screen brightness adjustment instruction.

For example, the screen determines the direction of brightness adjustment based on the received screen brightness adjustment instruction. The screen brightness adjustment instruction may be an instruction determined by the screen based on a brightness level of an environment in which the screen is located, or an instruction triggered by a user based on specific needs through a physical button or a virtual button on the screen. The screen brightness adjustment instruction includes the direction of brightness adjustment. The direction of brightness adjustment may include turning up or turning down the brightness. When the direction of brightness adjustment is turning down the brightness, it means that the screen brightness adjustment instruction instructs to dim the screen brightness, and when the direction of brightness adjustment is turning up the brightness, it means that the screen brightness adjustment instruction instructs to brighten the screen brightness. Further, the screen brightness adjustment instruction may also include desired target brightness.

It should be noted that the brightness of the screen indicates luminance of a screen. The unit of the luminance of a screen is nit. A physical quantity that determines the brightness of the screen is power supply voltage of the screen, and there is a one-to-one correspondence between the brightness of the screen and the power supply voltage of the screen. Therefore, the brightness of the screen may be determined by detecting the power supply voltage of the screen. Similarly, the target brightness indicated by the screen brightness adjustment instruction also corresponds to a target power supply voltage. Therefore, the brightness of the screen being adjusted to the target brightness may be understood as that the power supply voltage of the screen is adjusted to the target power supply voltage corresponding to the target brightness.

At block 102, a brightness level of a screen and a grayscale parameter of an image displayed on the screen are controlled based on the direction of brightness adjustment, such that brightness of the screen is adjusted to target brightness desired by the screen brightness adjustment instruction.

Figure 2:
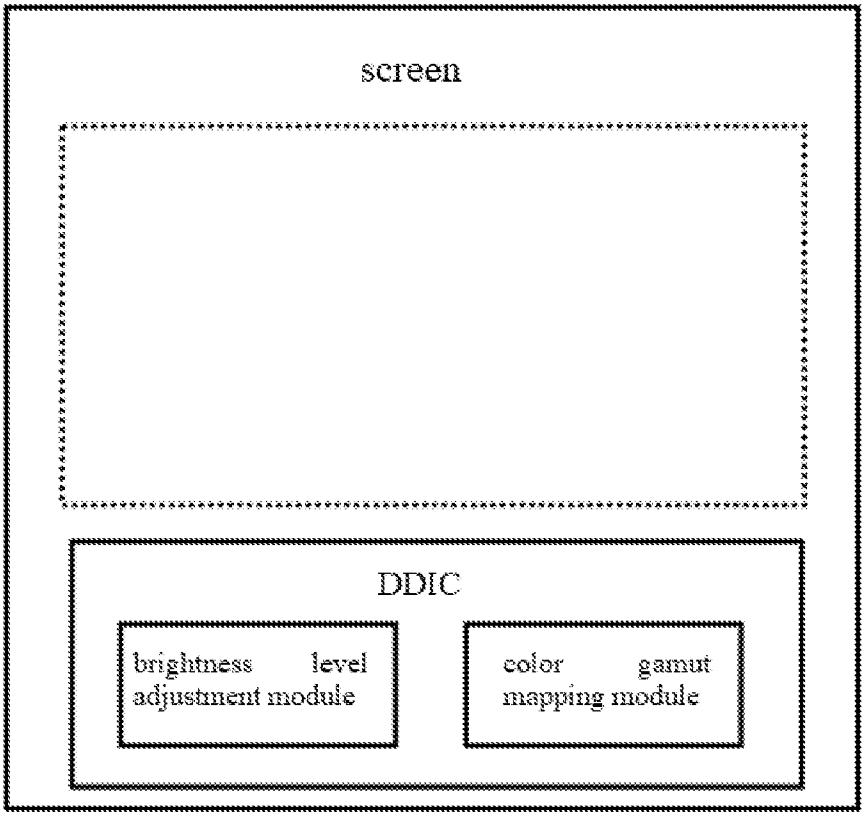
FIG. 2 is a schematic diagram of a DICC according to some embodiments.

Generally, the brightness of the screen is adjusted by the DDIC (display driver integrated circuit) of the screen. The structure of the DDIC is as illustrated in FIG. 2, which at least includes a brightness level adjustment module and a color gamut mapping module. When adjusting the brightness of the screen, the power supply voltage of the screen is usually changed by the brightness level adjustment module to change the brightness level of the screen. It may be understood that the brightness level adjustment module directly adjusts the brightness of the screen. Different brightness levels correspond to different power supply voltages. For example, power supply voltage corresponds to a brightness level 1098 is +3V, and power supply voltage corresponds to a brightness level 1095 is +2.9V. However, the brightness levels may only be divided into a fixed number of brightness levels (for example, 2047) from the brightest to the darkest level, so that the user may observe obvious brightness jitter on the screen during the adjustment process, influencing the user experience.

The color gamut mapping module may adjust the grayscale parameter of the image displayed on the screen by changing the power supply voltage of the screen, where the grayscale parameter indicates the brightness of the image. It may be understood that the color gamut mapping module changes the content of the image displayed on the screen by changing the grayscale parameter, and thus the brightness is visually changed for the user. The number of bits of the color gamut mapping module determines a range of the grayscale parameter. For example, when the number of bits of the color gamut mapping module is 8 bits, the range of the grayscale parameter is 0-255. When the number of bits of the color gamut mapping module is 12 bits, the range of the grayscale parameter is 0-4096. The grayscale parameter controls brightness levels of light sources corresponding to sub-pixels (such as red, green, and blue sub-pixels) included in each pixel of the screen.

Different brightness levels correspond to a full-scale grayscale parameter. For example, when the brightness level of the screen is 2047, the range of the grayscale parameter of the image displayed on the screen is 0-255, and when the brightness level of the screen is 1025, the range of the grayscale parameter of the image displayed on the screen is also 0-255. Therefore, the brightness level of the screen and the grayscale parameter of the image displayed on the screen may be combined to jointly control the brightness of the screen, so that the brightness of the screen may be adjusted to the target brightness. By adjusting the brightness level of the screen, the brightness of the screen may change greatly between different brightness levels. By adjusting the grayscale parameter of the image, the brightness of the screen may change slightly between adjacent brightness levels.

In detail, after determining that the direction of brightness adjustment is turning down the brightness, the current brightness level of the screen may be kept unchanged, and then a brightness level that is one level lower than the current brightness level is determined as a next brightness level. Then, an original grayscale parameter of the image is multiplied by each of at least one preset adjustment coefficient, and the grayscale parameter of the image is controlled based on each product obtained. The at least one preset adjustment coefficient is sequentially reduced in an order of multiplication, thereby gradually reducing the grayscale parameter of the image to slowly turn down the brightness of the screen. When the power supply voltage corresponding to the brightness of the screen reaches the power supply voltage corresponding to the next brightness level, the current brightness level of the screen may be adjusted to the next brightness level, and the grayscale parameter of the image may be returned back to the original grayscale parameter of the image. When a difference between the target brightness and the brightness of the screen before adjustment is small, the screen brightness adjustment instruction may be implemented between two adjacent brightness levels by only lowering the grayscale parameter of the image. When the difference between the target brightness and the brightness of the screen before adjustment is great, the grayscale parameter of the image is firstly reduced between two adjacent brightness levels, then the brightness level of the screen is reduced, and the above adjustment processes are repeated to achieve a purpose of reducing the brightness of the screen smoothly among several brightness levels. The original grayscale parameter of the image may be understood as a grayscale parameter of the image when the screen receives the image, independent of the screen. When the direction of brightness adjustment is turning up the brightness, the current brightness level of the screen may be increased by one level. At the same time, the grayscale parameter of the image may be set to a minimum value within an allowable range, and then the grayscale parameter of the image may be gradually increased until the grayscale parameter of the image is returned back to the original grayscale parameter of the image. The above adjustment process is repeated to achieve a purpose of increasing the brightness of the screen smoothly among several brightness levels.

As such, according to some embodiments of the present disclosure, the direction of brightness adjustment is determined based on the screen brightness adjustment instruction, and then the brightness level of the screen and the grayscale parameter of the image displayed on the screen are controlled based on the direction of brightness adjustment, such that the brightness of the screen is adjusted to the target brightness desired by the screen brightness adjustment instruction. Various embodiments of the present disclosure are not limited by hardware adjustment capability and the size of the panel border of the screen. In addition, the brightness of the screen may be adjusted with reference to both the brightness level and the grayscale parameter of the image, and thus the brightness of the screen changes smoothly during the adjustment process, and the stability of brightness adjustment is improved.

Figure 3:
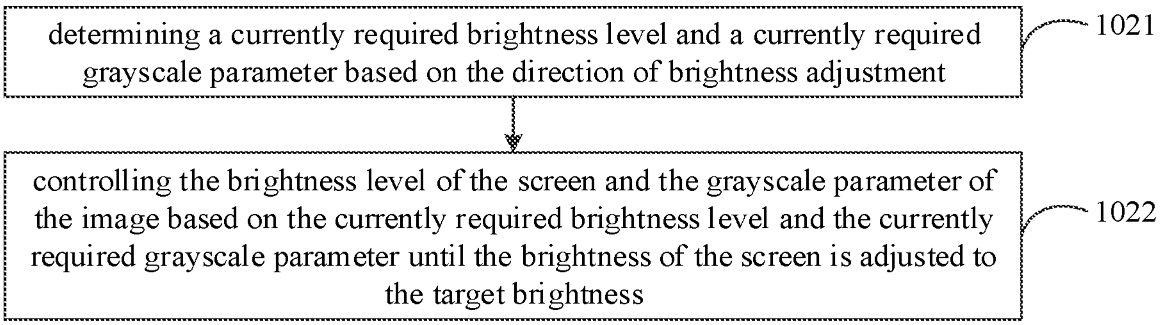
FIG. 3 is a flowchart of a screen brightness adjustment method according to some other embodiments.

FIG. 3 is a flowchart of a screen brightness adjustment method according to some other embodiments. As illustrated in FIG. 3, the implementation of block 102 may include the following.

At block 1021, a currently required brightness level and a currently required grayscale parameter are determined based on the direction of brightness adjustment.

At block 1022, the brightness level of the screen and the grayscale parameter of the image are controlled based on the currently required brightness level and the currently required grayscale parameter until the brightness of the screen is adjusted to the target brightness.

For example, the required brightness level currently used to control the brightness level of the screen and the required grayscale parameter currently used to control the grayscale parameter of the image may be determined based on the direction of brightness adjustment. The required brightness level and the required grayscale parameter jointly determine a minimum amount of change in brightness in the direction of brightness adjustment. When the gap between the target brightness and the brightness of the screen before adjustment is small, actions at block 1021 and block 1022 may be executed once to achieve the purpose of adjusting the brightness of the screen to the target brightness. Generally, when the target brightness desired by the screen brightness adjustment instruction is quite different from the current brightness of the screen, the screen brightness adjustment instruction may be implemented by repeating actions at block 1021 and block 1022 for multiple times. For each time of executing the actions, the brightness level of the screen and the grayscale parameter of the image are controlled according to the required brightness level and the required grayscale parameter at the time of the execution, so that the brightness of the screen may be adjusted based on the minimum amount of change. Actions at blocks 1021 to 1022 are performed repeatedly until the brightness of the screen is smoothly adjusted to the target brightness.

For different directions of brightness adjustment, the currently required brightness level may be a current brightness level of the screen, that is, a current screen brightness level, or may be a brightness level adjacent to the current brightness level. The currently required grayscale parameter may be a product of the grayscale parameter of the image and each of at least one preset adjustment coefficient, where a variation range of the adjustment coefficient is (0, 1].

In a specific implementation scene, for different directions of brightness adjustment, different ways may be selected to control the brightness level of the screen and the grayscale parameter of the image.

In a scene where the direction of brightness adjustment is turning down the brightness, the current brightness level of the screen is used as the required brightness level. The original grayscale parameter of the image is multiplied by each of the preset N adjustment coefficients, and each product obtained is used as the required grayscale parameter. N is a positive integer greater than or equal to 1, N adjustment coefficients are sequentially reduced based on an order of the multiplication with the original grayscale parameter, and the variation range of each adjustment coefficient is (0, 1]. N may be understood as a resolution of an adjustment coefficient, and is related to the number of bits in the color gamut mapping module.

Correspondingly, the action at block 1022 may include the following.

The brightness level of the screen and the grayscale parameter of the image are controlled based on the currently required brightness level and the currently required grayscale parameter until the brightness of the screen reaches a next brightness level.

In response to determining that the brightness of the screen reaches the next brightness level, the current brightness level of the screen is adjusted to the next brightness level. The next brightness level is one brightness level lower than the currently required brightness level.

For example, when the direction of brightness adjustment is turning down the brightness, the current brightness level of the screen may be kept unchanged, that is, the required brightness level is determined as the current brightness level of the screen. At the same time, the original grayscale parameter of the image is multiplied by a first adjustment coefficient in the N adjustment coefficients to obtain the required grayscale parameter. The first adjustment coefficient may be the largest adjustment coefficient among the N adjustment coefficients other than 1. When a product of the original grayscale parameter and an adjustment coefficient is a decimal, a rounding operation may be performed on the product to determine the required grayscale parameter. After that, the grayscale parameter of the image is controlled based on the required grayscale parameter. In this manner, the current brightness level of the screen is kept unchanged, the grayscale parameter of the image decreases, and the brightness of the screen decreases. Further, it is determined whether the brightness of the screen reaches the next brightness level (one brightness level lower than the required brightness level) based on the current power supply voltage of the screen. When the brightness of the screen reaches the next brightness level, the current brightness level of the screen is adjusted to the next brightness level, and the adjustment coefficient is set to 1. At this time, the brightness level of the screen decreases, the grayscale parameters of the image return to the original grayscale parameters, and the brightness of the screen decreases. When the brightness of the screen does not reach the next brightness level, the original grayscale parameter of the image is multiplied by a second adjustment coefficient in the N adjustment coefficients, and the product is determined as the required grayscale parameter for the next execution.

For example, the current brightness level of the screen is level 127, the image is a solid color image, and the original grayscale parameter is 150. The N adjustment coefficients may be 0.95, 0.9, 0.85, 0.8, 0.75, and 0.7. The power supply voltage corresponding to brightness level 127 is +1.2V, and the power supply voltage corresponding to brightness level 126 (that is, the next brightness level) is +1.1V. A range of the grayscale parameter is 0-255, corresponding a power supply voltage range from −0.1V to +0.1V, the power supply voltage corresponding to the grayscale parameter 150 is +0.005V, and the power supply voltage corresponding to the grayscale parameter 143 is −0.004V.

To turn down the brightness of the screen, when actions at blocks 1021 to 1022 are performed for the first time, the required brightness level is level 127, the adjustment coefficient is 0.95, and thus the required grayscale parameter is $150*0.95=142.5\approx 143$. The brightness level adjustment module in DICC keeps the voltage +1.2V unchanged, thereby keeping the brightness level of the screen at level 127. At the same time, the color gamut mapping module in DICC reduces the voltage to −0.004V by changing a resistance value, and adjusts the grayscale parameter of the image to 143 so as to reduce the brightness of the screen. After that, the adjustment coefficient is updated to 0.9. Then it is determined whether the brightness of the screen reaches the next brightness level (i.e., level 126), that is, it is determined whether the power supply voltage of the screen reaches +1.1V. At this time, the power supply voltage of the screen is +1.2−0.004=+1.196V, thus level 126 is not reached. Consequently, actions at blocks 1021 to 1022 are performed again. When the power supply voltage of the screen reaches level 126, the brightness level adjustment module reduces the voltage to +1.1V by changing the resistance value. The brightness level of the screen becomes level 126, and the color gamut mapping module keeps +0.005V unchanged. Actions at blocks 1021 to 1022 are repeated until the brightness of the screen is adjusted to the target brightness.

In this manner, compared with reducing the brightness level of the screen level by level in the related art, according to embodiments of the present disclosure, the brightness of the screen is smoothly reduced between adjacent brightness levels by reducing the grayscale parameter of the image, and thus the stability of brightness adjustment is improved.

In a scene where the direction of brightness adjustment is turning up the brightness, the next brightness level is determined as the required brightness level. The original grayscale parameter of the image is multiplied by each of the preset N adjustment coefficients, and each product obtained is determined as the required grayscale parameter. The next brightness level is one brightness level higher than the current brightness level of the screen. N is a positive integer greater than or equal to 1, N adjustment coefficients are sequentially increased in an order of multiplication with the original grayscale parameter, and a variation range of each adjustment coefficient is (0, 1]. N may be understood as a resolution of an adjustment coefficient, and is related to the number of bits in the color gamut mapping module.

Correspondingly, the action at block 1022 may include the following.

The brightness level of the screen and the grayscale parameter of the image are controlled based on the currently required brightness level and the currently required grayscale parameter until the grayscale parameter of the image returns back to the original grayscale parameter.

In response to determining that the grayscale parameter of the image returns back to the original grayscale parameter, the next brightness level is increased by one brightness level.

For example, when the direction of brightness adjustment is turning up the brightness, the next brightness level (one brightness level higher than the current brightness level) is determined as the required brightness level. The original grayscale parameter of the image is multiplied by a first adjustment coefficient in the N adjustment coefficients to obtain the required grayscale parameter. The first adjustment coefficient may be the smallest adjustment coefficient among the N adjustment coefficients, which may be determined based on the sensitivity of human eyes to the grayscale parameter. For example, when a grayscale parameter of an image is reduced by more than 25%, human eyes may obviously feel the change of the image, so a minimum adjustment coefficient may be set to 0.75. When a product of the original grayscale parameter and an adjustment coefficient is a decimal, a rounding operation may be performed to determine the required grayscale parameter. After that, the current brightness level of the screen is controlled based on the required brightness level, and at the same time, the grayscale parameter of the image is controlled based on the required grayscale parameter. When the grayscale parameter of the image is returned back to the original grayscale parameter, the next brightness level is increased by one brightness level, and the next brightness level updated is determined as the required brightness level a next execution of adjustment. When the grayscale parameter of the image does not reach the original grayscale parameter, the current brightness level of the screen is kept unchanged, and the original grayscale parameter of the image is multiplied by a second adjustment coefficient in the N adjustment coefficients. The product is determined as the required grayscale parameter for the next execution.

For example, the current brightness level of the screen is level 126, the image is a solid color image, and the original grayscale parameter is 150. The N adjustment coefficients may be 0.75, 0.8, 0.85, 0.95, and 1. The power supply voltage corresponding to the brightness level 127 (that is, the next brightness level) is +1.2V, and the power supply voltage corresponding to the brightness level 126 is +1.1V. A range of the grayscale parameter is 0-255, corresponding to a power supply voltage range from −0.1V to +0.1V, the power supply voltage corresponding to the grayscale parameter 150 is +0.005V, and the power supply voltage corresponding to the grayscale parameter 113 is −0.03V.

To turn up the brightness of the screen, when actions at blocks 1021 to 1022 are performed for the first time, the required brightness level is level 127, the adjustment coefficient is set to 0.75, and thus a corresponding required grayscale parameter is 150*0.75=112.5≈113. The brightness level adjustment module in DICC increases the voltage to +1.2V by changing a resistance value, and at the same time, the color gamut mapping module in DICC reduces the voltage to −0.03V by changing the resistance value to adjust the grayscale parameter of the image to 113. After that, the adjustment coefficient is updated to 0.8. At this time, the power supply voltage of the screen is +1.2−0.03=+1.17V. Actions at blocks 1021 to 1022 are performed for the second time. At this time, the adjustment coefficient is less than 1, the grayscale parameter of the image does not reach the original grayscale parameter, thus the current brightness level of the screen remains unchanged, that is, the required brightness level is determined to be level 127, and the required grayscale parameter is 150*0.8=120. Actions at blocks 1021 to 1022 are performed repeatedly until the adjustment coefficient is increased to 1 and the grayscale parameter of the image is returned back to the original grayscale parameter, then the next brightness level becomes level 128, that is, when actions at blocks 1021 to 1022 are executed the next time, the required brightness level is level 128, and such a process is repeated until the brightness of the screen is adjusted to the target brightness.

In this manner, compared with increasing the brightness level of the screen level by level in the related art, according to embodiments of the present disclosure, the grayscale parameter of the image is reduced while increasing the brightness level for adjacent brightness levels, such that the brightness of the screen increases smoothly, improving the stability of brightness adjustment.

As such, in various embodiments of the present disclosure, the direction of brightness adjustment is determined based on the screen brightness adjustment instruction, and then the brightness level of the screen and the grayscale parameter of the image displayed on the screen are controlled based on the direction of brightness adjustment, such that the brightness of the screen is adjusted to the target brightness desired by the screen brightness adjustment instruction. Various embodiments of the present disclosure are not limited by hardware adjustment capability and the size of the panel border of the screen. In addition, the brightness of the screen may be adjusted with reference to both the brightness level and the grayscale parameter of the image, and thus the brightness of the screen changes smoothly during the adjustment process, and the stability of brightness adjustment is improved.

Figure 4:
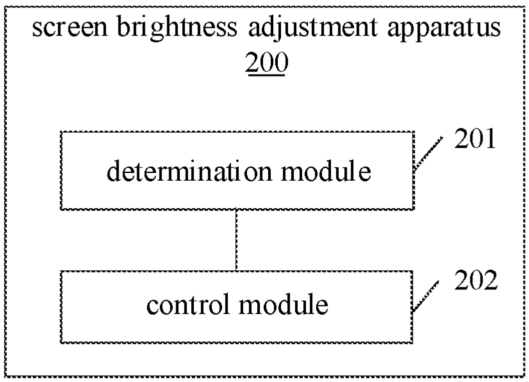
FIG. 4 is a block diagram of a screen brightness adjustment apparatus according to some embodiments.

FIG. 4 is a block diagram of a screen brightness adjustment apparatus according to some embodiments. As illustrated in FIG. 4, an apparatus 200 includes a determination module 201 and a control module 202.

The determination module 201 is configured to determine a direction of brightness adjustment based on a screen brightness adjustment instruction.

The control module 202 is configured to control a brightness level of a screen and a grayscale parameter of an image displayed on the screen based on the direction of brightness adjustment, such that brightness of the screen is adjusted to target brightness desired by the screen brightness adjustment instruction.

Figure 5:
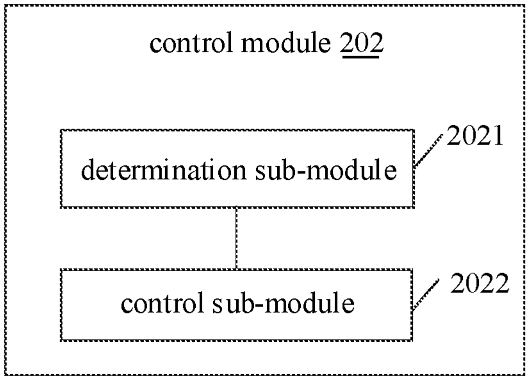
FIG. 5 is a block diagram of a screen brightness adjustment apparatus according to some other embodiments.

FIG. 5 is a block diagram of a screen brightness adjustment apparatus according to some other embodiments. As illustrated in FIG. 5, the control module 202 includes a determination sub-module 2021 and a control sub-module 2022.

The determination sub-module 2021 is configured to determine a currently required brightness level and a currently required grayscale parameter based on the direction of brightness adjustment.

The control sub-module 2022 is configured to control the brightness level of the screen and the grayscale parameter of the image based on the currently required brightness level and the currently required grayscale parameter until the brightness of the screen is adjusted to the target brightness.

In detail, in a scene where the direction of brightness adjustment is turning down the brightness, the determination sub-module 2021 is configured to determine a current brightness level of the screen as the currently required brightness level, and to determine a product obtained from multiplying an original grayscale parameter of the image by each of preset N adjustment coefficients as the currently required grayscale parameter.

Correspondingly, the control sub-module 2022 is configured to: control the brightness level of the screen and the grayscale parameter of the image based on the currently required brightness level and the currently required grayscale parameter until the brightness of the screen reaches a next brightness level; and in response to determining that the brightness of the screen reaches the next brightness level, adjust the current brightness level of the screen to the next brightness level, in which the next brightness level is one brightness level lower than the currently required brightness level. N is a positive integer greater than or equal to 1.

Alternatively, the preset N adjustment coefficients sequentially decrease in an order of multiplication with the original grayscale parameter, in which each of the preset N adjustment coefficients is less than or equal to 1, and greater than 0.

In a scene where the direction of brightness adjustment is turning up the brightness, the determination sub-module 2021 is configured to determine a next brightness level as the currently required brightness level, and to determine a product obtained from multiplying an original grayscale parameter of the image by each of preset N adjustment coefficients as the currently required grayscale parameter, in which the next brightness level is one brightness level higher than the current brightness level of the screen.

Correspondingly, the control sub-module 2022 is configured to: control the brightness level of the screen and the grayscale parameter of the image based on the currently required brightness level and the currently required grayscale parameter until the grayscale parameter of the image returns back to the original grayscale parameter; and in response to determining that the grayscale parameter of the image returns back to the original grayscale parameter, increase the next brightness level by one brightness level. N is a positive integer greater than or equal to 1.

Alternatively, the preset N adjustment coefficients sequentially increase in an order of multiplication with the original grayscale parameter. Each of the preset N adjustment coefficients is less than or equal to 1, and greater than 0.

Regarding the apparatus in the above embodiments, the specific manner in which each module performs operations has been described in detail in embodiments related to the method embodiments, and thus will not be elaborated here.

As such, according to some embodiments of the present disclosure, the direction of brightness adjustment is determined based on the screen brightness adjustment instruction, and then the brightness level of the screen and the grayscale parameter of the image displayed on the screen are controlled based on the direction of brightness adjustment, such that the brightness of the screen is adjusted to the target brightness desired by the screen brightness adjustment instruction. The disclosure is not limited by hardware adjustment capability and the size of the panel border of the screen. In addition, the brightness of the screen may be adjusted with reference to both the brightness level and the grayscale parameter of the image, and thus the brightness of the screen changes smoothly during the adjustment process, and the stability of brightness adjustment is improved.

The present disclosure further provides a computer-readable storage medium having a computer program instruction stored thereon. When the program instruction is executed by a processor, the screen brightness adjustment method provided by the present disclosure is implemented.

Figure 6:
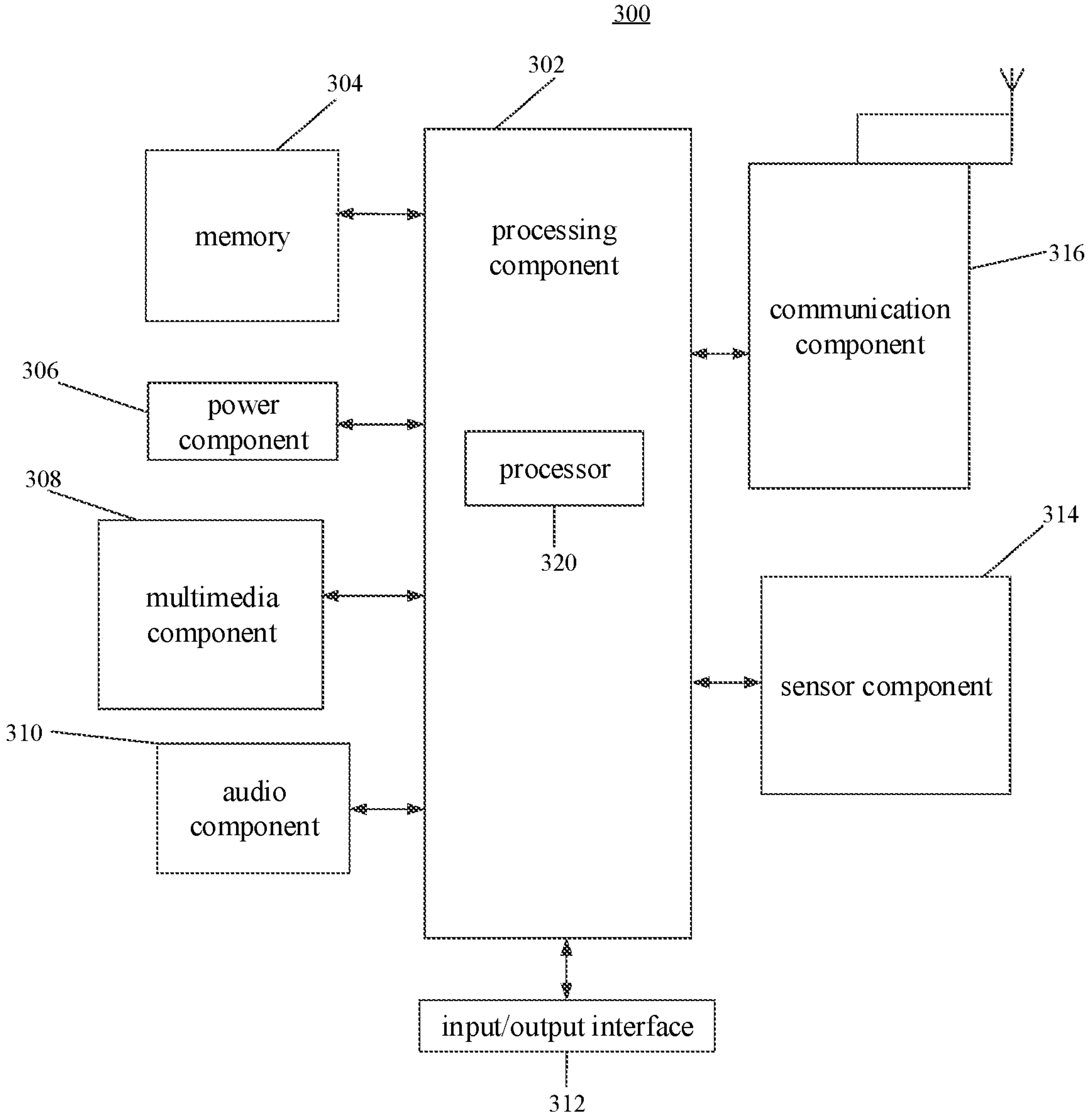
FIG. 6 is a block diagram of a screen brightness adjustment apparatus according to some embodiments.

FIG. 6 is a block diagram of a screen brightness adjustment apparatus 300 according to some embodiments. For example, the apparatus 300 may be a mobile phone, a computer, a digital broadcast terminal, a messaging device, a game console, a tablet device, a medical device, an exercise device, a personal digital assistant, and so on.

Referring to FIG. 6, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls the overall operation of the apparatus 300, such as operations associated with displaying, telephone calls, data communications, camera operations and recording operations. The processing component 302 may include one or a plurality of processors 320 to execute instructions so as to perform all or part of the steps of the above described screen brightness adjustment method. In addition, the processing component 302 may include one or a plurality of modules to facilitate interactions between the processing component 302 and other components. For example, the processing component 302 may include a multimedia unit to facilitate interactions between the multimedia component 308 and the processing component 302.

The memory 304 is configured to store various types of data to support operations at the apparatus 300. Examples of such data include instructions for any application or method operated on the apparatus 300, contact data, phone book data, messages, images, videos, and the like. The memory 304 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk, or an optical disk.

The power component 306 provides power to various components of the apparatus 300. The power component 306 may include a power management system, one or a plurality of power sources, and other components associated with power generation, management, and distribution of power of the apparatus 300.

The multimedia component 308 includes a screen that provides an output interface between the apparatus 300 and the user. In some embodiments, the screen may include a liquid crystal display (LCD) and a touch panel (TP). In some embodiments, an organic light-emitting diode (OLED) display can be employed.

When the screen includes a touch panel, the screen may be implemented as a touch screen to receive input signals from the user. The touch panel includes one or a plurality of touch sensors to sense touches, slides, and gestures on the touch panel. The touch sensors may sense not only a boundary of the touch or sliding actions, but also a duration and a pressure related to the touch or sliding operations. In some embodiments, the multimedia component 308 includes a front camera and/or a rear camera. When the apparatus 300 is in an operation mode such as a shooting mode or a video mode, the front camera and/or the rear camera may receive external multimedia data. Each of the front camera and the rear camera may be a fixed optical lens system or have a focal length and an optical zoom capability.

The audio component 310 is configured to output and/or input an audio signal. For example, the audio component 310 includes a microphone (MIC) that is configured to receive an external audio signal when the apparatus 300 is in an operation mode such as a call mode, a recording mode, and a voice recognition mode. The received audio signal may be further stored in the memory 304 or transmitted via the communication component 316. In some embodiments, the audio component 310 further includes a speaker for outputting audio signals.

The I/O interface 312 provides an interface between the processing component 302 and a peripheral interface module. The peripheral interface module may be a keyboard, a click wheel, buttons, and so on. These buttons may include, but are not limited to, a home button, a volume button, a start button, and a locking button.

The sensor component 314 includes one or a plurality of sensors for providing the apparatus 300 with various aspects of status assessments. For example, the sensor component 314 may detect an open/closed status of the apparatus 300 and a relative positioning of the components. For example, the components may be a display and a keypad of the apparatus 300. The sensor component 314 may also detect a change in position of the apparatus 300 or a component of the apparatus 300, a presence or absence of contact of a user with the apparatus 300, an orientation or acceleration/deceleration of the apparatus 300, and a temperature change of the apparatus 300. The sensor component 314 may include a proximity sensor configured to detect the presence of nearby objects without any physical contact. The sensor component 314 may also include a light sensor, such as a CMOS or a CCD image sensor, for use in imaging applications. In some embodiments, the sensor component 314 may further include an acceleration sensor, a gyro sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard such as Wi-Fi, 2G, 3G, 4G, 5G, or a combination thereof. In some embodiments, the communication component 316 receives broadcast signals or broadcast-associated information from an external broadcast management system via a broadcast channel. In some embodiments, the communication component 316 further includes a near field communication (NFC) module to facilitate short range communication. For example, for the NFC module, the short-range communication may be implemented based on a radio frequency identification (RFID) technology, an infrared data association (IrDA) technology, an ultra-wideband (UWB) technology, a Bluetooth (BT) technology, and other technologies.

In some embodiments, the apparatus 300 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above screen brightness adjustment method.

In some embodiments, there is also provided a non-transitory computer readable storage medium including instructions, such as a memory 304 including instructions. The instructions are executable by the processor 320 of the apparatus 300 to perform the above screen brightness adjustment method. For example, the non-transitory computer readable storage medium may be a ROM, a random-access memory (RAM), a CD-ROM, a magnetic tape, a floppy disk, an optical data storage device, etc.

In some other embodiments, a computer program product is also provided. The computer program product includes a computer program that can be executed by a programmable device. The computer program has a code portion for executing the above-described screen brightness adjustment method when executed by the programmable device.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A screen brightness adjustment method, comprising:

determining a direction of brightness adjustment based on a screen brightness adjustment instruction;

determining a currently required brightness level and a currently required grayscale parameter based on the direction of brightness adjustment; and controlling a brightness level of a screen and a grayscale parameter of an image displayed on the screen based on the on the currently required brightness level and the currently required grayscale parameter until the brightness of the screen is adjusted to a target brightness, wherein said determining the currently required grayscale parameter comprises:

determining a product obtained from multiplying an original grayscale parameter of image by each of preset N adjustment coefficients as the currently required grayscale parameter, and N being a positive integer greater than or equal to 1.

2. The method of claim 1, wherein the direction of the brightness adjustment is turning down the brightness, and said determining the currently required brightness level comprises:

determining a current brightness level of the screen as the currently required brightness level;

controlling the brightness level of the screen and the grayscale parameter of the image based on the currently required brightness level and the currently required grayscale parameter comprises:

controlling the brightness level of the screen and the grayscale parameter of the image based on the currently required brightness level and the currently required grayscale parameter until the brightness of the screen reaches a next brightness level; and in response to determining that the brightness of the screen reaches the next brightness level, adjusting the current brightness level of the screen to the next brightness level, the next brightness level being one brightness level lower than the currently required brightness level.

3. The method of claim 2, wherein the preset N adjustment coefficients sequentially decrease in an order of multiplication with the original grayscale parameter, each of the preset N adjustment coefficients being less than or equal to 1, and greater than 0.

4. The method of claim 1, wherein the direction of brightness adjustment is turning up the brightness, and said determining the currently required brightness level comprises:

determining a next brightness level as the currently required brightness level, the next brightness level being one brightness level higher than a current brightness level of the screen;

controlling the brightness level of the screen and the grayscale parameter of the image based on the currently required brightness level and the currently required grayscale parameter comprises:

controlling the brightness level of the screen and the grayscale parameter of the image based on the currently required brightness level and the currently required grayscale parameter until the grayscale parameter of the image returns back to the original grayscale parameter; and in response to determining that the grayscale parameter of the image returns back to the original grayscale parameter, increasing the next brightness level by one brightness level, N being a positive integer greater than or equal to 1.

5. The method of claim 4, wherein the preset N adjustment coefficients sequentially increase in an order of multiplication with the original grayscale parameter, each of the preset N adjustment coefficients being less than or equal to 1, and greater than 0.

6. A screen brightness adjustment apparatus, comprising:

a processor; and a memory component configured to store instructions executable by the processor; wherein the processor is configured to:

determine a direction of brightness adjustment based on a screen brightness adjustment instruction;

determine a currently required brightness level and a currently required grayscale parameter based on the direction of brightness adjustment;

control a brightness level of a screen and a grayscale parameter of an image displayed on the screen based on the on the currently required brightness level and the currently required grayscale parameter until the brightness of the screen is adjusted to a target brightness, wherein said determining the currently required grayscale parameter comprises:

determine a product obtained from multiplying an original grayscale parameter of image by each of preset N adjustment coefficients as the currently required grayscale parameter, and N being a positive integer greater than or equal to 1.

7. The apparatus of claim 6, wherein the direction of the brightness adjustment is turning down the brightness, and said determining the currently required brightness level, the processor is further configured to:

determine a current brightness level of the screen as the currently required brightness level;

when controlling the brightness level of the screen and the grayscale parameter of the image based on the currently required brightness level and the currently required grayscale parameter, the processor is further configured to:

control the brightness level of the screen and the grayscale parameter of the image based on the currently required brightness level and the currently required grayscale parameter until the brightness of the screen reaches a next brightness level; and in response to determining that the brightness of the screen reaches the next brightness level, adjusting the current brightness level of the screen to the next brightness level, the next brightness level being one brightness level lower than the currently required brightness level.

8. The apparatus of claim 7, wherein the preset N adjustment coefficients sequentially decrease in an order of multiplication with the original grayscale parameter, each of the preset N adjustment coefficients being less than or equal to 1, and greater than 0.

9. The apparatus of claim 7, wherein the direction of brightness adjustment is turning up the brightness, when determining the currently required brightness level the processor is configured to:

determine a next brightness level as the currently required brightness level, the next brightness level being one brightness level higher than a current brightness level of the screen;

when controlling the brightness level of the screen and the grayscale parameter of the image based on the currently required brightness level and the currently required grayscale parameter, the processor is configured to:

control the brightness level of the screen and the grayscale parameter of the image based on the currently required brightness level and the currently required grayscale parameter until the grayscale parameter of the image returns back to the original grayscale parameter; and in response to determining that the grayscale parameter of the image returns back to the original grayscale parameter, increase the next brightness level by one brightness level, N being a positive integer greater than or equal to 1.

10. The apparatus of claim 8, wherein the preset N adjustment coefficients sequentially increase in an order of multiplication with the original grayscale parameter, each of the preset N adjustment coefficients being less than or equal to 1, and greater than 0.

11. A non-transitory computer-readable storage medium having a computer program instruction stored thereon that, when executed by a processor, a screen brightness adjustment method is implemented, the method including:

determining a direction of brightness adjustment based on a screen brightness adjustment instruction;

determining a currently required brightness level and a currently required grayscale parameter based on the direction of brightness adjustment;

controlling a brightness level of a screen and a grayscale parameter of an image displayed on the screen based on the on the currently required brightness level and the currently required grayscale parameter until the brightness of the screen is adjusted to a target brightness, wherein said determining the currently required grayscale parameter comprises:

determining a product obtained from multiplying an original grayscale parameter of image by each of preset N adjustment coefficients as the currently required grayscale parameter, and N being a positive integer greater than or equal to 1.

12. The non-transitory storage medium of claim 11, wherein the direction of the brightness adjustment is turning down the brightness, and said determining the currently required brightness level comprises:

determining a current brightness level of the screen as the currently required brightness level;

controlling the brightness level of the screen and the grayscale parameter of the image based on the currently required brightness level and the currently required grayscale parameter comprises:

controlling the brightness level of the screen and the grayscale parameter of the image based on the currently required brightness level and the currently required grayscale parameter until the brightness of the screen reaches a next brightness level; and in response to determining that the brightness of the screen reaches the next brightness level, adjusting the current brightness level of the screen to the next brightness level, the next brightness level being one brightness level lower than the currently required brightness level.

13. The non-transitory storage medium of claim 12, wherein the preset N adjustment coefficients sequentially decrease in an order of multiplication with the original grayscale parameter, each of the preset N adjustment coefficients being less than or equal to 1, and greater than 0.

14. The non-transitory storage medium of claim 11, wherein the direction of brightness adjustment is turning up the brightness, determining the currently required brightness level comprises:

determining a next brightness level as the currently required brightness level, the next brightness level being one brightness level higher than a current brightness level of the screen;

controlling the brightness level of the screen and the grayscale parameter of the image based on the currently required brightness level and the currently required grayscale parameter comprises:

controlling the brightness level of the screen and the grayscale parameter of the image based on the currently required brightness level and the currently required grayscale parameter until the grayscale parameter of the image returns back to the original grayscale parameter; and in response to determining that the grayscale parameter of the image returns back to the original grayscale parameter, increasing the next brightness level by one brightness level, N being a positive integer greater than or equal to 1.

15. The non-transitory storage medium of claim 14, wherein the preset N adjustment coefficients sequentially increase in an order of multiplication with the original grayscale parameter, each of the preset N adjustment coefficients being less than or equal to 1, and greater than 0.

16. A mobile terminal implementing the screen brightness adjustment method of claim 1, comprising the screen having a panel border, wherein the brightness adjustment of the mobile terminal is not limited by hardware adjustment capability and size of the panel border of the screen.

17. The mobile terminal of claim 16, wherein the mobile terminal is configured to adjust the brightness of the screen with reference to both the brightness level and the grayscale parameter of the image, to thereby change the brightness of the screen smoothly during the adjustment, and improve stability of the brightness adjustment.

* * * * *